United States Patent
Walega et al.

(10) Patent No.: US 8,375,530 B2
(45) Date of Patent: Feb. 19, 2013

(54) REMOTELY-ACTUATED SEAT BELT BUCKLE

(75) Inventors: Frank Glenn Walega, Dearborn, MI (US); Thomas Grzybowski, Fraser, MI (US); Brandon Scott Marriott, Waterford, MI (US); Nicklaus John Pelliccia, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/550,002

(22) Filed: Jul. 16, 2012

(65) Prior Publication Data

US 2012/0279028 A1 Nov. 8, 2012

Related U.S. Application Data

(62) Division of application No. 12/385,150, filed on Mar. 31, 2009, now Pat. No. 8,240,012.

(60) Provisional application No. 61/193,064, filed on Oct. 24, 2008.

(51) Int. Cl.
  *A41F 1/00* (2006.01)
  *A43C 11/00* (2006.01)
  *A44B 1/04* (2006.01)
  *A44B 11/25* (2006.01)
  *A44B 17/00* (2006.01)
(52) U.S. Cl. .......... 24/603; 24/602; 180/268; 280/801.1
(58) Field of Classification Search .............. 24/573.11, 24/579.11, DIG. 51, 572.1, 602, 603; 280/801.1, 280/808; 180/268–270
See application file for complete search history.

(56) References Cited

U.S. PATENT DOCUMENTS

| | | | |
|---|---|---|---|
| 3,134,154 A | 5/1964 | Smith et al. |
| 3,146,846 A | 9/1964 | Gutshall |
| 3,168,158 A | 2/1965 | Schoeffler |
| 3,194,582 A | 7/1965 | Kutz |
| 3,311,188 A | 3/1967 | Gutshall |
| 3,729,059 A | 4/1973 | Redmond |
| 3,963,090 A | 6/1976 | Hollins |
| 4,162,715 A | 7/1979 | Coulombe |
| 4,413,384 A | 11/1983 | Lassche |
| 4,432,119 A | 2/1984 | Schwark et al. |
| 4,553,625 A | 11/1985 | Tsuge et al. |
| 4,574,911 A | 3/1986 | North |

(Continued)

OTHER PUBLICATIONS

Non-Final Office Action U.S. Appl. No. 12/335,150 dated Aug. 15, 2011.

(Continued)

*Primary Examiner* — Robert J Sandy
*Assistant Examiner* — Abigail E Morrell
(74) *Attorney, Agent, or Firm* — Foley & Lardner LLP

(57) ABSTRACT

A buckle assembly for a vehicle includes a seat belt tongue and a seat belt buckle with a blocking mechanism and a manual release button. The blocking mechanism is configured to latch the tongue in the buckle. The buckle assembly further includes a remote buckle release mechanism, including a buckle release cable and a module operably connected to the cable. The module is configured to pull the cable to release the blocking mechanism to thereby release the seat belt tongue from the buckle. The buckle assembly is also configured to be actuated by an occupant via the manual release button on the buckle. The remote buckle release mechanism does not interfere with operation of the manual release button. The remote buckle release mechanism may also be configured to automatically release the buckles a predetermined time after an airbag deployment.

7 Claims, 9 Drawing Sheets

U.S. PATENT DOCUMENTS

| | | |
|---|---|---|
| 4,691,939 A | 9/1987 | Sato |
| 4,742,886 A | 5/1988 | Sato |
| 5,123,673 A | 6/1992 | Tame |
| 5,181,738 A * | 1/1993 | Shimizu .................... 280/801.1 |
| 5,182,836 A | 2/1993 | Burkat |
| 5,274,890 A | 1/1994 | Shimizu et al. |
| 5,765,660 A * | 6/1998 | Ambrosi ....................... 180/268 |
| 6,123,166 A * | 9/2000 | Verellen ....................... 180/268 |
| 6,428,049 B1 * | 8/2002 | Nichols ....................... 280/801.1 |
| 6,988,297 B2 * | 1/2006 | Willard et al. .................. 24/633 |
| 2005/0087973 A1 * | 4/2005 | Cornell ....................... 280/801.1 |

OTHER PUBLICATIONS

Non-Final Office Action U.S. Appl. No. 12/385,150 dated Oct. 27, 2011.

Notice of Allowance U.S. Appl. No. 12/385,150 dated Apr. 11, 2012.

* cited by examiner

REMOTELY-ACTUATED SEAT BELT BUCKLE

CROSS-REFERENCE TO RELATED PATENT APPLICATIONS

This application is a Divisional of U.S. patent application Ser. No. 12/385,150, filed Mar. 31, 2009, and claims priority to U.S. Provisional Patent Application No. 61/193,064, filed Oct. 24, 2008, both of which are incorporated by reference herein in their entireties.

BACKGROUND

This application relates generally to the field of vehicle occupant restraint systems. More particularly, this application relates to a vehicle occupant restraint system having a latch plate and buckle assembly with the ability to remotely release the latch plate through an electric signal while maintaining full mechanical functionality in the event of power failure.

Conventional occupant restraint systems for vehicles typically include a matable latch plate and buckle assembly configured to secure the vehicle occupant to a seat during rapid acceleration and deceleration of the vehicle. These restraint systems can be found in front seats, rear seats, third seats, etc., or any combination thereof.

Many conventional occupant restraint systems for vehicles remotely release the seat belt buckle by separating the buckle head from the buckle strap, while the buckle and latch plate remain engaged. This causes a large mass that is free to contact the occupant in a potentially harmful manner while being retracted by the retractor.

In the event of an emergency vehicle situation, such as a sudden stop, collision, rapid change of altitude, etc. it may become necessary to release a seat belt buckle remotely by a vehicle operator, other vehicle occupant, emergency personnel, etc., to facilitate the quick exit of occupants who may require assistance with their seat belt. For example, in school buses, it may be difficult for a bus driver to both unbuckle all of the children in a bus and help them exit safely in an emergency. Other potential applications could include seat belt buckles used in automobiles, trains, airplanes, motor coach buses, etc.

Therefore, it is desirable for a seat belt buckle and latch to incorporate the ability to be released remotely, in the event of an emergency situation, through the use of an electrical signal to actuate an electromechanical device. The buckle should maintain full mechanical functionality in the event of power failure.

It is also desirable that the additional components required to achieve the remote functionality of the seat belt buckle allow the latch plate to release by itself so as not to create a large mass that could result in occupant injury release.

It is also desirable that electrical consumption and heat generation found in alternative designs be minimized.

SUMMARY

One embodiment of the invention relates to a buckle assembly for a vehicle. The buckle assembly comprises a seat belt with a tongue and a seat belt buckle with a blocking mechanism and a manual release button. The buckle is configured to receive and releasably latch to the tongue. The buckle assembly further comprises a remote buckle release mechanism that includes a buckle release cable, and a motor module operably connected to the buckle release cable. The motor module is configured to pull the cable to release the blocking mechanism to thereby release the tongue from the buckle. The buckle assembly is also configured to be actuated by the manual release button to unlatch the tongue from the buckle. The motor module is actuated from a location remote from the buckle to thereby release the tongue from the buckle via the remote buckle release mechanism Another embodiment relates to a vehicle comprising a plurality of seats. Each of the seats includes a seat belt with a tongue and a seat belt buckle with a blocking mechanism and a manual release button. The buckle is configured to receive and releasably latch to the tongue. Each seat further includes a buckle release cable connected to the blocking mechanism of the buckle. The cable is configured to release the blocking mechanism to thereby release the seat belt tongue from the buckle when the cable is pulled. Actuation of the manual release button on the buckle unlatches the tongue from the buckle.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate preferred embodiments of the invention and together with the description serve to explain principles of the invention.

FIG. 12A illustrates a cable release mechanism with a hook and ladder assembly, according to an embodiment. FIG. 12B illustrates a cable release mechanism with a dual cam arrangement, according to an embodiment. FIG. 12C illustrates a cable release mechanism with a push device, according to an embodiment.

DETAILED DESCRIPTION

Figure 1:
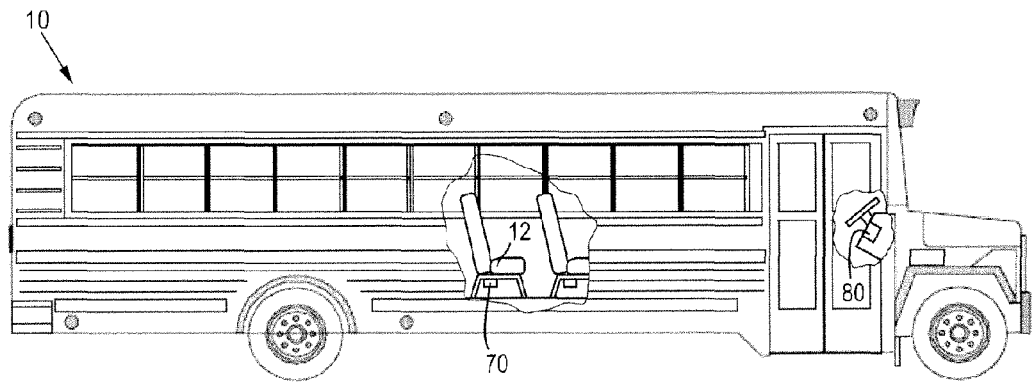
FIG. 1 is a side view of a vehicle including a seat with a remotely actuated seat belt assembly according to an exemplary embodiment.

According to embodiments of the invention, a buckle assembly is illustrated that has the ability to remotely release a seat belt latch plate through an electric signal while maintaining full mechanical functionality in the event of power failure or regular use to allow for manual release of the buckle assembly. The buckle assembly maintains all of the redundant safety and convenience of a mechanical, FMVSS209 (Federal Motor Vehicle Regulation SS 209) compliant buckle, but adds the ability for someone other than the seat occupant to release the latch plate remotely by using a button, switch, or other device mounted elsewhere in the vehicle to activate a motor module for the buckle. The remote device provides an actuation signal to an electronic control module. This control module controls the buckle release system, including monitoring the performance of the various motor modules present in the vehicle. The control module further monitors other devices in the vehicle, such as the status of each seat-mounted electronic control units (ECUs), status of the vehicle rollover sensor, etc.

This signal to remotely release a seat belt from a buckle can be sent by any number of means, including through a wire (e.g., CANBUS communication, a simple current pulse, LIN-BUS, Pulse Width Modulation, etc.), or wirelessly (e.g., "Bluetooth" type communication). The signal instructs a buckle or seat mounted electronic control unit (ECU) to provide power to a motor module that, when powered, pulls on cables that act to release one or more buckles. The cables, in one embodiment, are rigidly affixed to a drum or spindle that is driven through a gear train by a motor module or other actuation device such as a solenoid, etc. Rotation of the drum causes the cables to be wound onto the drum and release the buckle. In a preferred embodiment, an automotive throttle-style or cycling derailleur-type cable (inner cable sliding freely within an outer sheath) is used. As the spindle turns, the movement of the cable forcibly moves the blocking mechanism in the buckle, allowing the latch plate to be ejected. In a preferred embodiment, the cable shortens approximately 5 mm to move the blocking mechanism enough to allow the buckle mechanism to release the latch plate. Alternatively, any suitable mechanism may be utilized that will move the cable (shorten the cable) to move the blocking mechanism to release the latch plate.

Each ECU may monitor the status of a switch in each buckle that is used to determine whether the buckle is buckled or not. The ECU may also monitor whether the motor and wire harnesses are connected and ready to function; and to communicate these parameters to the control module.

The seat-mounted ECU may also accept inputs from seat weight sensors or other occupant classification device(s), in addition to inputs from the seat belt usage sensor(s), so that the control module can determine if a particular seat is occupied, and what size occupant is in the seat. This information can be communicated back to the vehicle control module. For example, the information can provide the driver with a clear understanding of whether all occupants seated in a particular seat have the corresponding buckle latched. The control module may display this information on a screen adjacent to the driver's seating position.

In an exemplary embodiment, in case of emergency, the seat belt buckle can be released remotely by the vehicle driver, etc. to facilitate the quick exit of occupants who may otherwise need special assistance with their seat belt. One exemplary application of this disclosure is school buses. It may be very difficult for a bus driver to both unbuckle all of the children in a bus and help them exit safely in an emergency. Other potential applications include automobiles, and mass-transit vehicles, such as motor coaches, military transport vehicles, trains, airplanes, etc. Actuation could also be triggered by other signals, such as an airbag deployment sensor, rollover detection sensor (if vehicle comes to rest right-side up), or a remote vehicle monitoring system (OnStar, etc.).

By configuring the buckle such that the cable interface does not directly act on the lock bar or ejector spring, but rather operates on the blocking mechanism (slider and/or lock pin) after the buckle has been properly latched, the buckle maintains the ability to be used in a traditional manner (i.e., manually operating), with a spring loaded release button, even though the buckle is also designed to be released remotely, thereby unaffecting normal buckle function. This ensures that the structural load path within the buckle is unaffected by the presence of the cable release mechanism, and the force required to actuate the release button spring is not changed.

In a preferred embodiment, the cable is designed to move the slider out from under the lock pin, thereby compressing the slider spring and allowing the ejector to push the slider upwards. When this occurs, the slider, which is no longer retained in the "lock" position by the lock pin, rotates upward and releases the lock bar. Once the lock bar has rotated away from the latch plate, the latch plate is ejected with the assistance of the ejector spring as it would manually be released when the release button is pushed.

Figure 2:
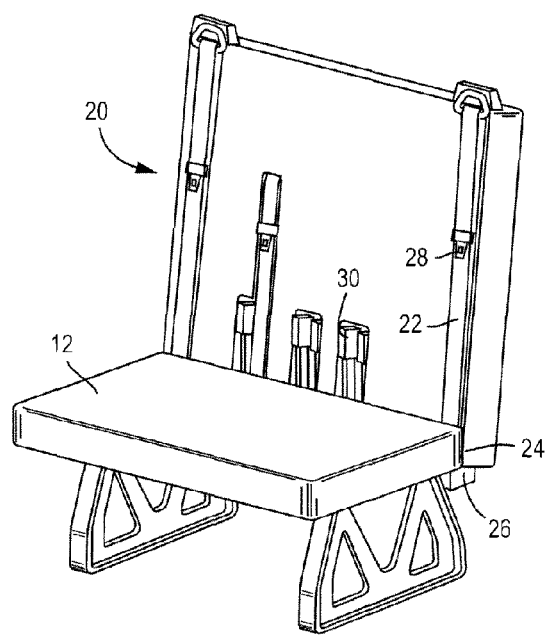
FIG. 2 is an isometric view of a seat for a vehicle including a remotely actuated seat belt assembly according to an exemplary embodiment.

Referring to FIGS. 1-2, a vehicle 10 is shown according to an exemplary embodiment including one or more seats 12 including seat belt systems 20 configured to retain an occupant in the seat 12. The vehicle 10 is shown as a bus, in particular, a Type C bus. According to other exemplary embodiments, the vehicle 10 may be any other kind of school, commercial, or motor-coach bus. According to still other embodiments, the vehicle 10 may be another type of mass transit vehicle including military transport vehicles, trains, airplanes, etc. According to yet other exemplary embodiments, the vehicle 10 may another type of motor vehicle including cars, trucks, sport utility vehicles, crossover vehicles, etc.

The seats, shown as bench-type seats 12, include one or more seat belt assemblies 20 (e.g., seat belt systems) to restrain an occupant and prevent occupants from being thrown from the seat 12 in a vehicle collision. The seat belt system 20 includes a webbing or belt 22 that extends from an anchor 24, through a latch plate 28 (e.g., tongue member), and to a retractor 26. The webbing 22 is drawn across the occupant's body by the latch plate 28, which engage a buckle 30. During a dynamic impact event of the vehicle, the retractor 26 locks the webbing 22 from extracting or unwinding, which restricts movement of the occupant.

Figure 6A:
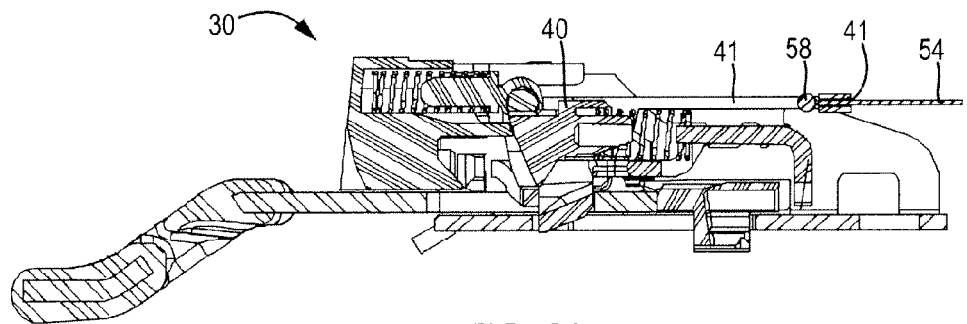
FIGS. 6A-6B are cross-sectional views of the seat belt buckle assembly of FIG. 3 taken along line 6-6 showing various stages of a remotely actuated release operation.
Figure 6B:
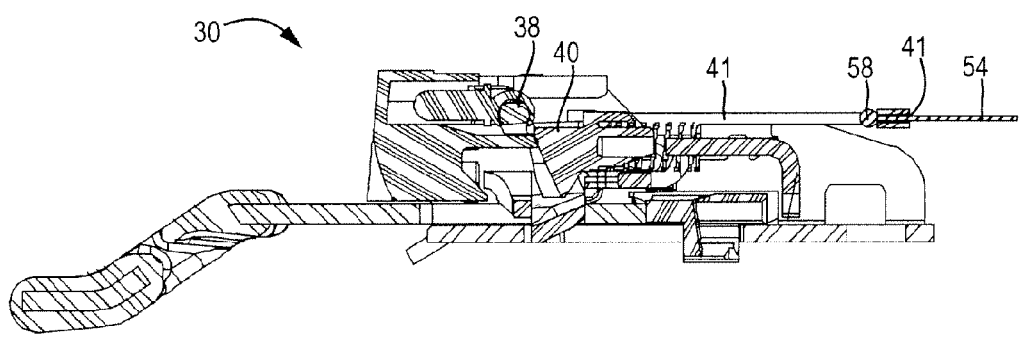
Figure 7:
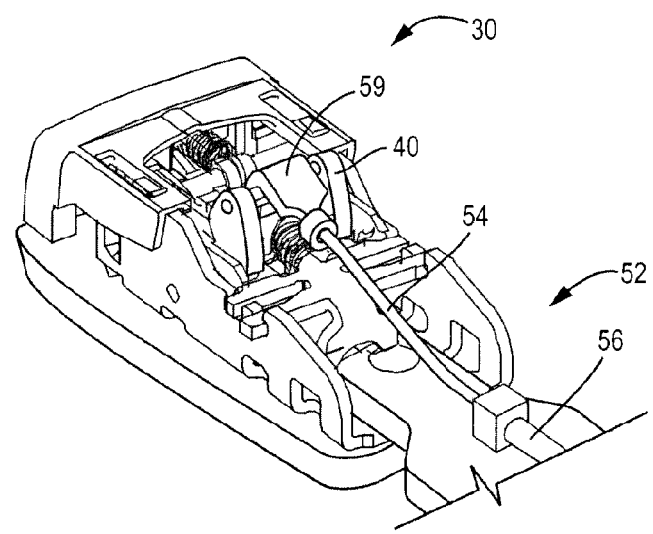
FIG. 7 is a side perspective view of a seat belt buckle assembly according to an exemplary embodiment.
Figure 8:
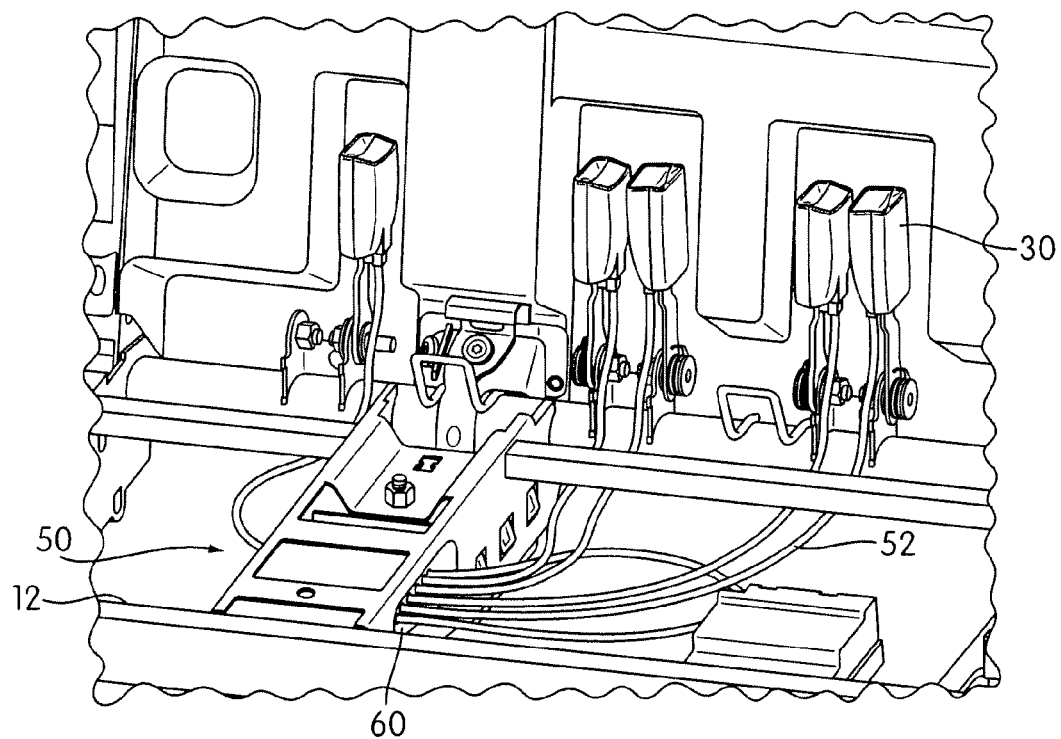
FIG. 8 is a perspective of a bottom of a bench-type bus seat showing the placement of a control module according to an exemplary embodiment.

Referring now to FIGS. 3-8, a buckle 30 for a seat belt assembly 20 is shown according to an exemplary embodiment. The buckle 30 is coupled to a rear cross member of a multi-person seat 12. The buckle 30 can be actuated either traditionally (i.e., manually) with a release button 32 or remotely with the use of a cable release mechanism 50 (FIG. 8). Similar to a conventional buckle, the buckle 30 illustrated includes a lock pin 38, to which the release button 32 is coupled with a collar 34 and a button spring 36. A slider 40 is coupled to a lock bar 44 with a slider spring 42. The slider 40 is held under the lock pin 38 when the tongue or latch bar plate 28 is engaged with the buckle 30 (e.g., latched, locked, fastened, etc.). When the slider 40 is held under the lock pin 38 it restricts the motion of the lock bar 44 which, in turn, retains the latch plate 28 in the buckle 30. An ejector 46 is contacted by the latch plate 28 and pushed inward when the latch plate 28 is engaged with the buckle 30, compressing an ejector spring 48 between the ejector 46 and the lock bar 44.

Figure 5A:
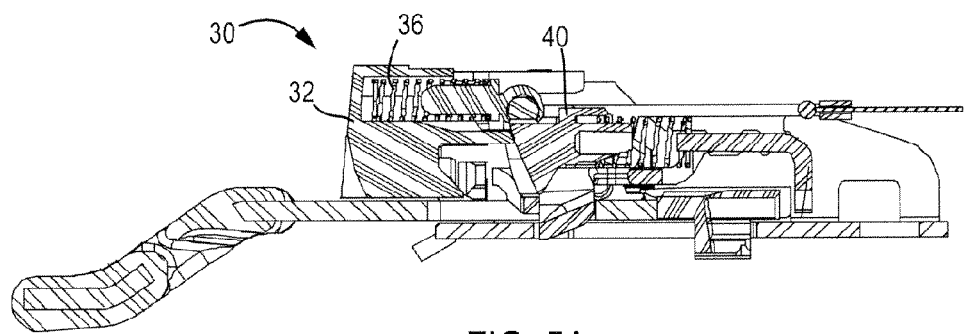
FIGS. 5A-5E are cross-sectional views of the seat belt buckle assembly of FIG. 3 taken along line 5-5 showing various stages of a manual release operation.
Figure 5B:
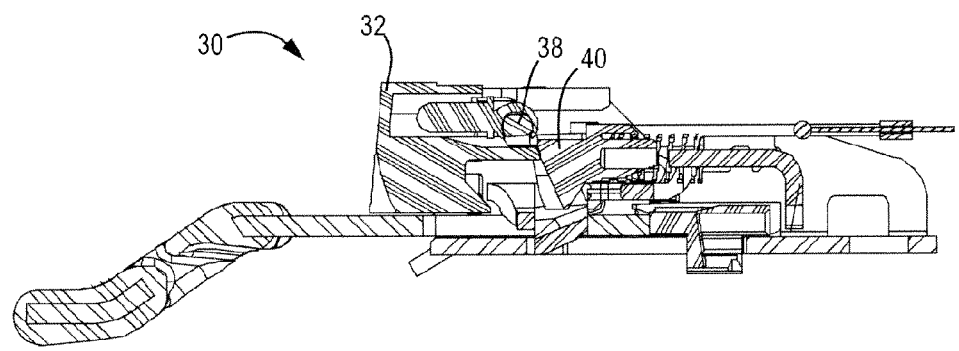
Figure 5C:
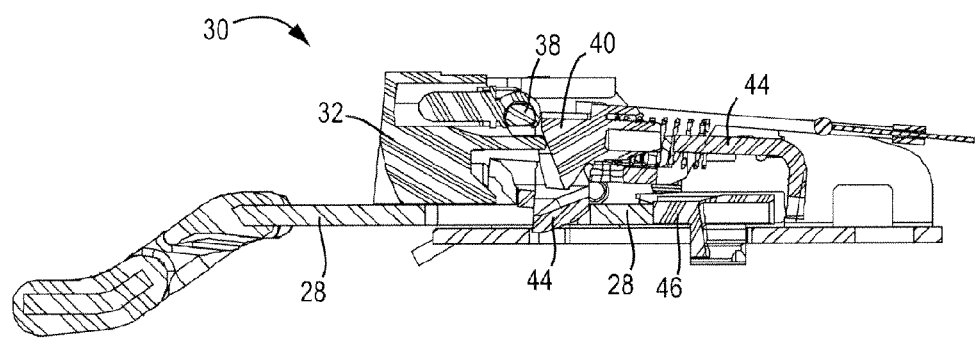
Figure 5D:
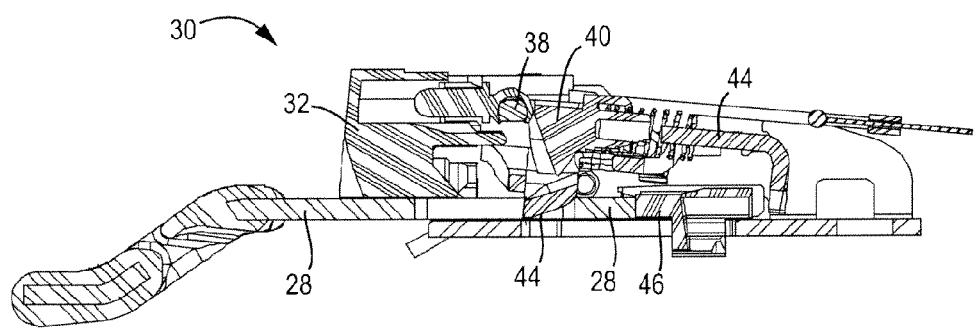
Figure 5E:
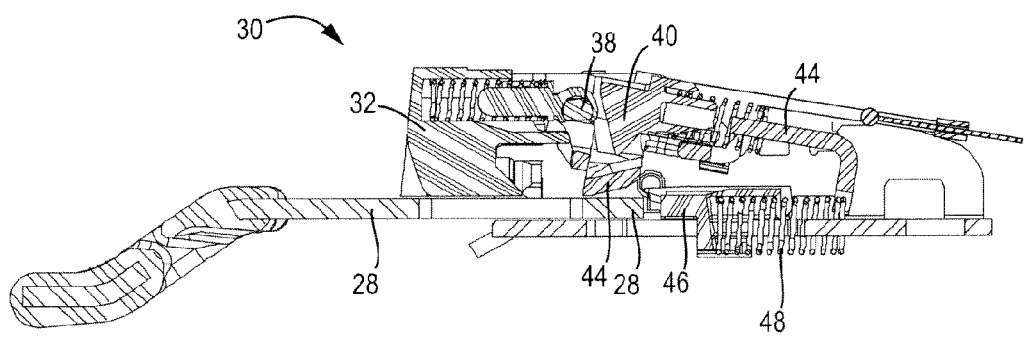

The buckle 30 is released manually by depressing the button 32 (FIG. 5A). The motion of the button 32 compresses the button spring 36 and contacts the slider 40, moving the slider 40 out from under the lock pin 38 (FIG. 5B). The slider 40 compresses the slider spring 42 and allows the ejector 46 to push the lock bar 44 upwards. When this occurs, the slider 40, which is no longer retained in the "lock" position by the lock pin 38, rotates upward and releases the lock bar 44 (FIG. 5C). Once the lock bar 44 has rotated away from the latch plate 28, the latch plate 28 pushed out of the buckle 30 by the ejector 46 with the assistance of the ejector spring 48 (FIGS. 5D and 5E). Springs 36, 42, and 48 are removed in some drawings for clarity.

It may be desirable to provide a mechanism for remotely releasing the buckle 30 in addition to the manual release of the buckle. According to an exemplary embodiment, the cable release mechanism 50 is configured to move the slider 40 and release the buckle 30 without interfering with the manual operation of the buckle 30. The cable release mechanism 50 includes an actuation cable 52 that is coupled on one end to a motor module 60 and on the opposite end to the slider 40 (FIG. 7). The actuation cable 52 may be, for example, automotive throttle-style or cycling derailleur-type cable, with an inner cable 54 sliding freely within an outer sheath 56. The motor modules 60 drive the cable release mechanisms 50 and are in turn operated and controlled by an electronic control unit 70.

Figure 3:
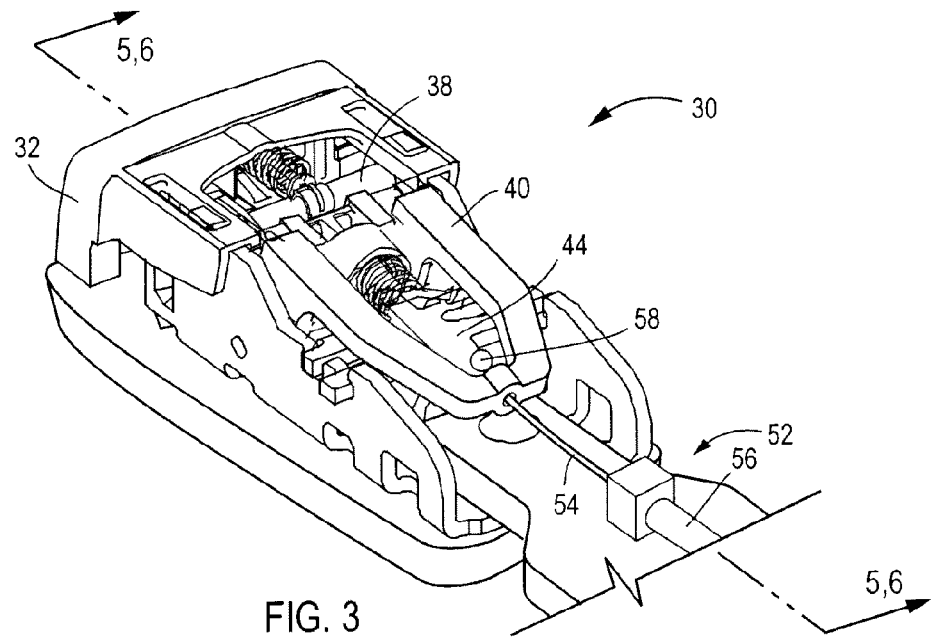
FIG. 3 is a top perspective view of a seat belt buckle assembly according to an exemplary embodiment with an upper cover removed.
Figure 4:
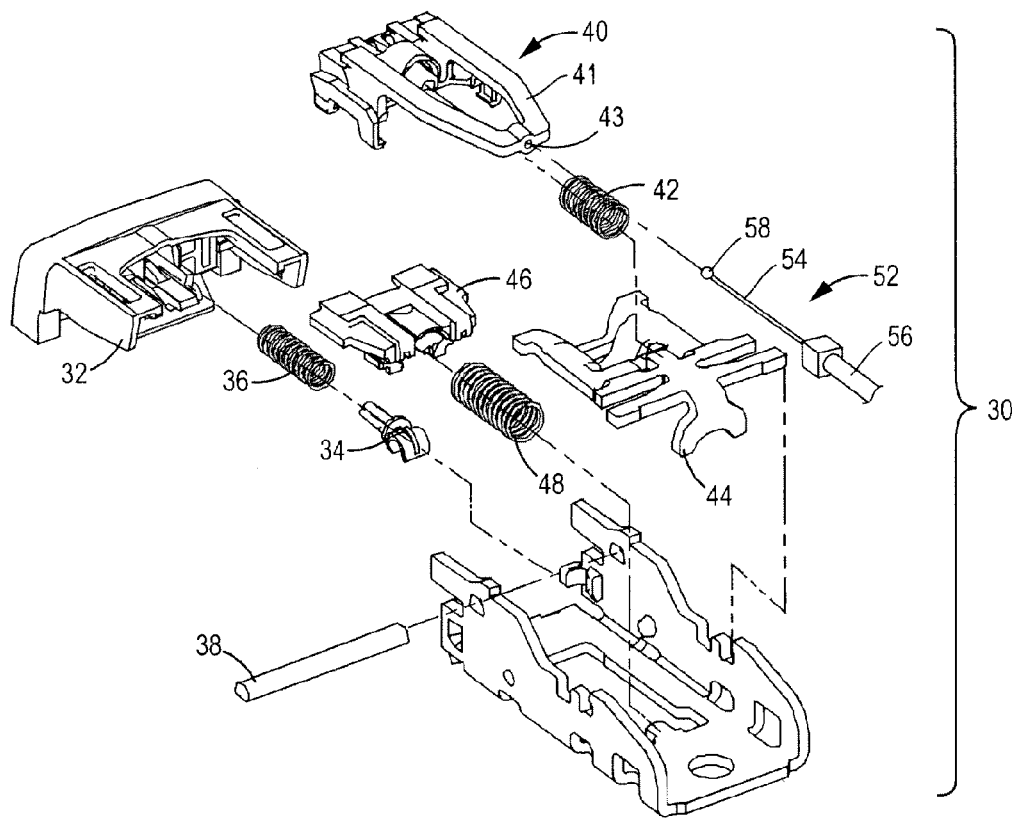
FIG. 4 is an exploded view of the seat belt buckle assembly of FIG. 3.

As shown best in FIG. 3, the actuation cable 52 is coupled to an arm 41 extending from the slider 40. The arm 41, shown as a U-shaped body, forms an opening 43 (e.g., hole, passage, aperture, etc.) through which the inner cable 54 passes. A stop 58, such as a ball-type cable end, is provided on the end of the inner cable 54. The opening 43 has a diameter larger than the diameter of the inner cable 54, allowing the inner cable 54 to slide freely through the opening 43. However, the stop 58 has a diameter larger than the diameter of the opening 43, preventing the end of the inner cable 54 from being pulled through the opening 43.

In an alternative arrangement, the motor module 60 and the electronic control unit (ECU) 70 may be combined into a single unit, such that the motor 60 could be contained directly in the ECU 70.

Figure 9:
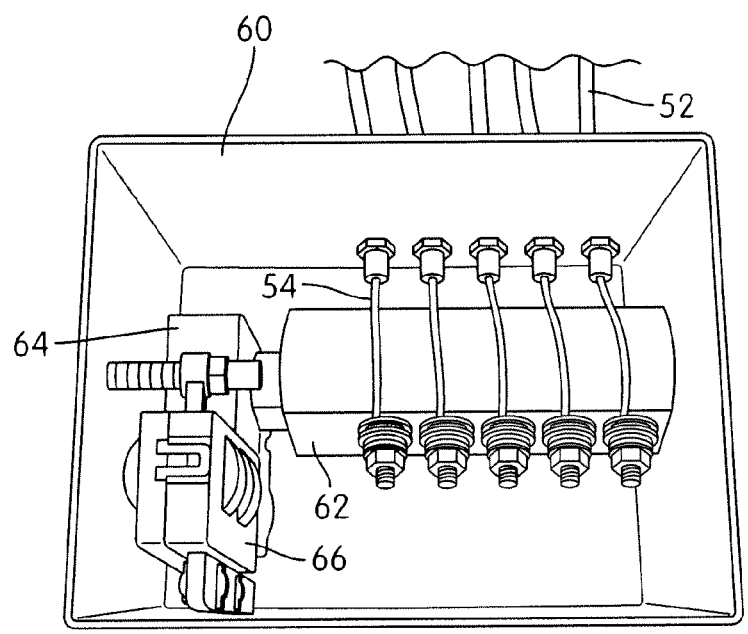
FIG. 9 is a perspective view of the control module according to an exemplary embodiment.

Referring to FIG. 8, the actuation cables 52 extend from within each buckle 30 and are routed from the buckles 30 to a motor module 60 that is mounted proximate to the buckles 30. According to an exemplary embodiment, the motor module 60 is coupled to the frame of the seat 12 but may be mounted anywhere in the proximity of the buckles 30 (e.g., to the vehicle floor, the vehicle wall, etc.). As shown best in FIG. 9, the end of the inner cable 54 opposite the buckle 30 is coupled to a drum or spindle member 62. The drum 62 is turned by a low-current motor 66. The speed and/or toque output of the motor 66 may be altered by providing a gear train 64 (e.g., a reductive gear train) between the motor 66 and the drum 62. The inner cable 54 is rigidly attached to the drum 62 such that, when the motor turns the drum 62 through the gear train 64, the inner cable 54 is wound around the drum 62. As the drum 62 turns, the inner cable 54 is pulled through the sheath 56, away from the buckle 30. According to an exemplary embodiment, several activation cables may be coupled to each drum 62. For instance, a bench seat 12 may include multiple buckles 30 that are each coupled to a single motor module 60. In this way, the motor module 60 can simultaneously release each buckle 30. According to other exemplary embodiments, a separate motor module 60 may be provided for each buckle 30.

By using a reductive gear train 64, the cable release mechanism requires only a small current to generate the needed applied force. By using a low-current motor 66 coupled to a reduction gear train 64, a very low power input (approximately 500 mA) to the motor 66 produces very high output torque on the spindle or drum 62. Additional mechanical advantage is gained by adjusting the diameter of the spindle or drum 62 to which the inner cables 54 are affixed (e.g., increasing the mechanical advantage by increasing the diameter). Together, these factors reduced the input power requirement for a remote-release buckle system from greater than 1 amp per buckle actuated singly to less than 1 amp for five buckles 30 released simultaneously.

Referring now especially to FIGS. 6A and 6B, the remote release of the buckle 30 by the cable release mechanism is shown. As the inner cable 54 is withdrawn towards the motor module 60, the inner cable 54 is pulled through the opening 43 in the arm 41 until the stop 58 coupled to the end of the inner cable 54 contacts the arm 41 (FIG. 6A). Continued pulling of the inner cable 54 causes the slider 40 to be pulled backward until it clears the lock pin 38 (FIG. 6B). Once the slider 40 is no longer restrained by the lock pin 38, the buckle 30 operates similar to the manual operation. The ejector 46 pushes the slider 40 upwards. When this occurs, the slider 40, which is no longer retained in the "lock" position by the lock pin 38, rotates upward and releases the lock bar 44. Once the lock bar 44 has rotated away from the latch plate 28, the latch plate 28 is pushed out of the buckle 30 by the ejector 46 with the assistance of the ejector spring 48.

As can be seen in FIGS. 5A-5E, because the travel of the inner cable 54 through the opening 43 in the slider 40 is limited only by the stop 58 provided on the end of the inner cable 54 (e.g., limiting the relative movement of the inner cable 54 relative to the slider 40 when the cable 54 is being pulled away from the slider 40), the actuation cable 52 does not interfere with the manual operation of the buckle 30. The actuation cable 52 allows for up to, for example, 2 mm of cable over-travel without interfering with the buckle mechanism. The cable 52 may allow up to any other appropriate amount of over-travel.

According to another exemplary embodiment, as shown in FIG. 7, the actuation cable 52 may be coupled to the slider 40 with a bar-and-hook style cable attachment 59.

Figure 10:
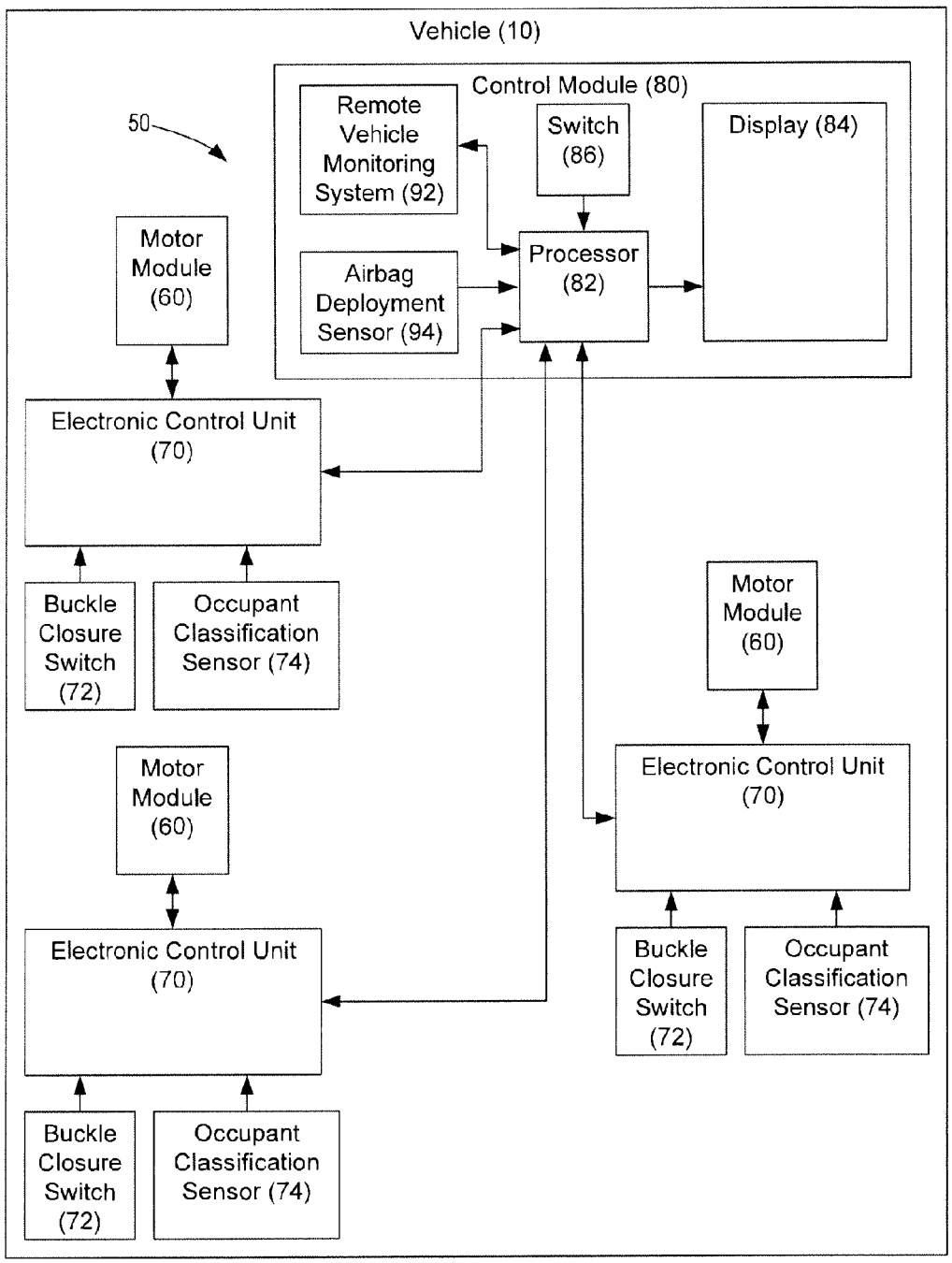
FIG. 10 is a block diagram of a cable release mechanism according to an exemplary embodiment.

The vehicle 10 may have multiple seat 12 and multiple electronic control units 70 driving the cable release mechanisms 50. As shown in FIGS. 1 and 10, the electronic control units 70 in the vehicle 10 may be in communication with a central control module 80. The preferred embodiment of the control module 80 includes a microprocessor 82 and electronics that communicate with the electronic control units 70. The electronic control units 70 may each be in communication with multiple systems related to seating, including buckle closure switches 72 that determine if each seat belt is buckled or not, seat occupant classification sensors 74, and one or more motor modules 60. A screen or display 84 may be provided to allow a driver to easily review the status of each of the seats 12 in the vehicle 10.

The control module 80 may monitor the system by receiving system readiness status and buckle/seat usage information from the electronic control units 70. The control module 80 may also distribute power and control signals to the electronic control units 70; distribute power to and monitor the response from buckle closure switches 72; and distribute power to and monitor the response from occupant classification sensors 74.

When a user such as the vehicle driver or an emergency worker activates a remote switch (emergency release button or switch) 86 coupled to the control module 80, the control module 80 sends motor actuation signals to the electronic control units 70 via a wired or wireless signal. The electronic control unit 70 activates the motor module 60, causing the motor 66 to turn and retract the activation cables 52, unlocking the associated buckles 30. The processor 82 of the control module 80 may also receive input from a remote vehicle monitoring system 92 (such as an On Star system), an airbag deployment sensor 94, or any other suitable sensor. Upon receiving the input from the monitoring system 92 and/or the airbag deployment sensor 94, the control module 80 may send motor actuation signals to the electronic control units 70 via a wired or wireless signal. For example, the control module 80 may be configured to automatically release the buckle 30 a predetermined amount of time after an airbag deployment based on input from the deployment sensor 94. The remote vehicle monitoring system 92 can permit a person monitoring the vehicle to remotely activate the buckle release mechanism based upon vehicle monitoring sensors and/or communication with a vehicle occupant or driver.

Figure 11:
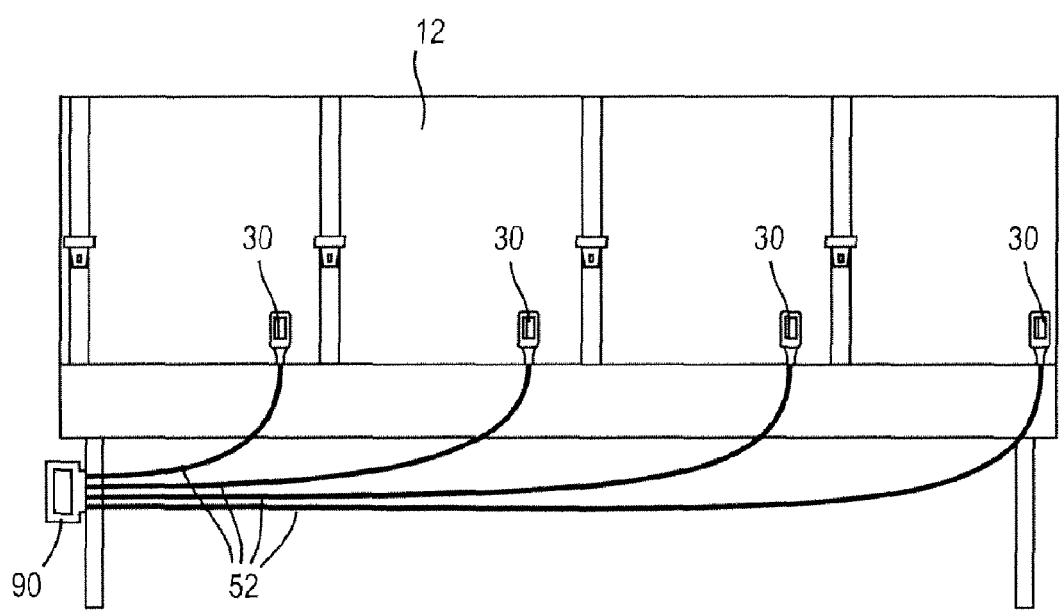
FIG. 11 is a perspective view of a vehicle seat with a manually operated buckle release system.

Referring now to FIG. 11, according to another exemplary embodiment, the actuation cables 52 may not be electronically controlled. Instead, the actuation cables 52 may be operated by a manual lever or emergency release handle 90. The ends of the inner cable 54 opposite the buckles 30 are coupled to the handle 90, which is mounted on the seat frame. As shown in FIG. 11, multiple cables 52 may be coupled to a single handle 90. According to other exemplary embodiments, individual handles 90 may be provided for each buckle 30.

The buckles 30 can be remotely released manually by pulling the handle 90 affixed to the vehicle seat 12. One exemplary application of this disclosure is military vehicles where several seat belt buckles 30 could be linked together to a single handle 90 at the end of a row of seats 12. In an emergency, when the handle 90 is pulled, all of the buckles 30 in the given row of seats 12 would simultaneously be unlatched. This will increase the speed at which emergency personnel can evacuate incapacitated soldiers from the vehicle 10.

The cable release mechanism can be configured in any suitable manner that will permit the cable to be pushed or pulled or grabbed as appropriate to release the blocking mechanism to thereby release the buckles. For example, FIGS. 12A-12C illustrate alternative cable release mechanisms 150.

Figure 12A:
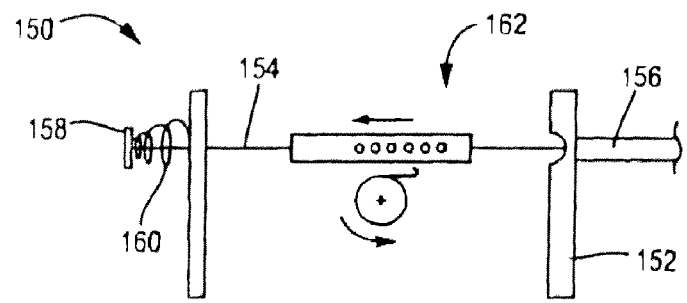
FIGS. 12A to 12C illustrate alternative cable release mechanism.

FIG. 12A illustrates a cable release mechanism 150 that includes a coil spring 160 and hook and ladder assembly 162. The inner cable 154 extends from the outer sheath or housing 156 and into the housing 152 for the cable release mechanism 150. A hook and ladder assembly 162 is attached to the inner cable 154. A ladder with openings of the hook and ladder assembly 162 is attached to the inner cable 154. A rotating hook of the hook and ladder assembly 162 is configured to rotate upon a release signal from a control module. When the hook rotates, the hook grabs an opening in the ladder, thus the hook and ladder assembly 162 pulls the inner cable 154 away from the blocking mechanism, to thereby release the buckle 30. A coil spring 160 is wrapped around a portion of the inner cable to provide suitable resistance for the inner cable 154. The coil spring 160 includes a support base 158 to support or hold the coil spring 160.

Figure 12B:
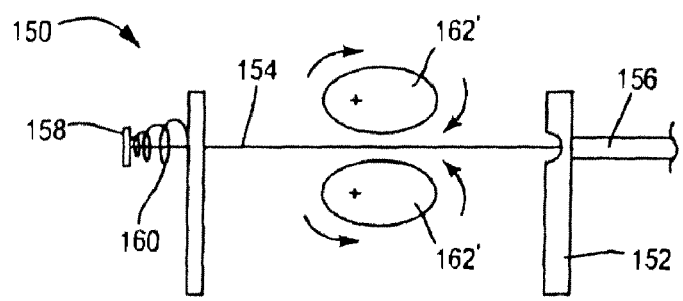

FIG. 12B illustrates a cable release mechanism 150 that is similar to the cable release mechanism illustrated in FIG. 12A except dual cams 162' are utilized to pull the inner cable 154. Upon actuation by a control signal, the dual cams 162' rotate around their respective pivot points. The upper cam 162' rotates in a clockwise direction and the lower cam 162' rotates in a counter-clockwise direction. Thus, when both the upper and lower cams 162' rotate, the inner cable 154 is pinched by the cams 162' and pulled or dragged in a direction away from the outer sheathing 156, thus pulling the blocking mechanism to release the buckles 30.

Figure 12C:
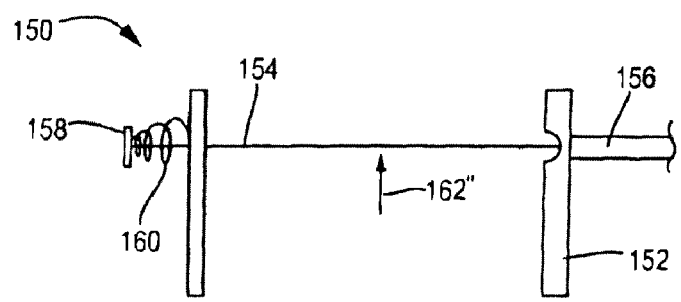

FIG. 12C illustrates a cable release mechanism 150 that is similar to the cable release mechanism illustrated in FIGS. 12A and 12B except that a push device 162" is utilized. Upon actuation by a control signal a push device 162" is moved vertically upward to push the inner cable 154 upward to thereby create an inverted V or triangular shape out of the inner cable 154, which loads the inner cable 154 to pull the inner cable 154 away from the blocking mechanism. It will be recognized that any suitable mechanism 162" that will move the cable 154 to pull and release the blocking mechanism can be used.

The cable release mechanism 50 uses a mechanical device to release the buckles 30 instead of drawing a large electrical current to generate the same amount of power. Because the remote release mechanism 50 is not in the mechanical load path within the buckle 30, the risk of mechanical failure, especially related to post-accident release of the latch plate, is lessened.

The cable release mechanism 50, as described above, does not rely on stored mechanical energy using, for example, a compressed spring, to generate sufficient force to move the slider and eject the latch plate. As a result, the cable release mechanism 50 is significantly more robust, uses fewer components, and is much less susceptible to inadvertent releases due to shock-or vibration loading than one using stored mechanical energy.

By moving most of the components of the remote actuation system outside of the buckle 30 itself, the size of the buckle "head" does not increase substantially. This allows the buckle 30 to be packaged in nearly all environments that currently use standard buckles without the need or cost of redesigning the seat 12 to accommodate the buckle 30.

The interface between the actuation cable 52 and the buckle mechanism requires that only the slider 40 and the upper buckle cover need to be changed compared to conventional buckles. The disclosed cable release mechanism 50, therefore, avoids the significant investment costs associated with changing and re-certifying other (especially load-bearing) buckle subcomponents that are unavoidable with other designs.

It is important to note that the construction and arrangement of the cable release mechanism as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, methods of pulling the cable, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A seat belt system for a vehicle comprising:
a seat belt connected to a tongue;
a buckle configured to releasably latch to the tongue;
wherein the buckle includes a blocking mechanism for preventing the tongue from being unlatched from the buckle, wherein the blocking mechanism includes a lock pin and a slider, and wherein the slider is movable between a locked position under the lock pin and an unlocked position not under the lock pin; wherein when the slider is in the locked position the slider prevents movement of the lock pin and when the slider is in the unlocked position the lock pin may move to allow the tongue to be released from the buckle;
wherein the buckle includes a manual release button, configured to be depressed to release the tongue from the buckle;
a cable connected to the slider, wherein the cable is configured to be pulled to move the slider from the locked to the unlocked position; and
a remotely actuated buckle release mechanism configured to control pulling the cable to release the tongue from the buckle.

2. The seat belt system of claim 1, wherein the buckle release mechanism includes a motor for driving a cable pulling device.

3. The seat belt system of claim 2, wherein the cable pulling device includes a rotating drum connected to the cable.

4. The seat belt system of claim 2, wherein the cable pulling device includes a rotating hook configured to engage a movable ladder connected to the cable.

5. The seat belt system of claim 2, wherein the cable pulling device includes a plurality of rotating cams that engage the cable to thereby cause the cable to be pulled as the cams rotate.

6. The seat belt system of claim 2, wherein the cable pulling device includes a push device configured to push against the cable to thereby cause the cable to pull the slider to the unlocked position.

7. The seat belt system of claim 1, further comprising a handle connected to the cable, wherein the handle is configured to be pulled to thereby cause the cable to pull the slider to the unlocked position.

* * * * *